United States Patent
Sterling et al.

(10) Patent No.: US 11,308,521 B2
(45) Date of Patent: *Apr. 19, 2022

(54) SECURE ELECTRONIC TRANSACTION AUTHORIZATION ON TOKENIZED IDENTIFIERS AND LOCATION DATA

(71) Applicant: Worldpay, LLC, Symmes Township, OH (US)

(72) Inventors: Jacob Matthew Sterling, Creve Coeur, MO (US); Brent Alan Badger, Powell, OH (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/106,510

(22) Filed: Nov. 30, 2020

(65) Prior Publication Data

US 2021/0081996 A1    Mar. 18, 2021

Related U.S. Application Data

(63) Continuation of application No. 14/504,725, filed on Oct. 2, 2014, now Pat. No. 10,929,888.

(60) Provisional application No. 61/886,037, filed on Oct. 2, 2013.

(51) Int. Cl.
  *G06Q 30/02* (2012.01)
  *G06Q 20/40* (2012.01)
(52) U.S. Cl.
  CPC ........ *G06Q 30/0268* (2013.01); *G06Q 20/40* (2013.01)

(58) Field of Classification Search
  CPC ........................ G06Q 30/0268; G06Q 20/40
  See application file for complete search history.

(56) References Cited

U.S. PATENT DOCUMENTS

| | | | |
|---|---|---|---|
| 8,180,702 B2 | 5/2012 | Debow | |
| 8,489,456 B2 | 7/2013 | Burgess et al. | |
| 8,505,813 B2* | 8/2013 | Grossman | G06F 21/31 235/379 |
| 8,751,295 B2 | 6/2014 | Tiku et al. | |
| 2008/0201230 A1 | 8/2008 | Hardison | |
| 2010/0049589 A1 | 2/2010 | Debow | |
| 2010/0049620 A1 | 2/2010 | Debow | |

(Continued)

OTHER PUBLICATIONS

S. Lu and S. A. Smolka, "Model checking the secure electronic transaction (SET) protocol," MASCOTS '99. Proceedings of the Seventh International Symposium on Modeling, Analysis and Simulation of Computer and Telecommunication Systems, College Park, MD, USA, 1999, pp. 358-364. (Year: 1999).*

*Primary Examiner* — Michael W Schmucker
*Assistant Examiner* — Christopher C Busch
(74) *Attorney, Agent, or Firm* — Bookoff McAndrews, PLLC

(57) ABSTRACT

Systems and methods for applying a promotion to a payment transaction originating at a point of sale system of a merchant are described. Transactional information is provided to an acquirer computing system of the merchant. Based on identifying indicia associated with the transactional information, the acquirer computing system determines whether to modify the payment transaction messaging before communicating it along to an issuer computing system.

20 Claims, 11 Drawing Sheets

(56) References Cited

U.S. PATENT DOCUMENTS

| | | | |
|---|---|---|---|
| 2011/0106601 A1* | 5/2011 | Perlman | G06Q 40/02 705/14.14 |
| 2013/0024256 A1* | 1/2013 | Wolf | G06Q 30/02 705/14.17 |
| 2013/0073361 A1 | 3/2013 | Silver | |
| 2013/0282470 A1* | 10/2013 | Schwarzkopf | G06Q 40/12 705/14.33 |
| 2014/0129314 A1* | 5/2014 | Kim | G06Q 30/0233 705/14.33 |
| 2014/0164083 A1 | 6/2014 | Wilkes | |
| 2014/0207542 A1 | 7/2014 | Wolfe | |

* cited by examiner

ACTIVE CAMPAIGNS

| CAMPAIGN [?] | CUSTOMERS TARGETED [?] | IMPRESSIONS [?] | REDEMPTIONS [?] | REVENUE [?] | COST [?] | COST / REVENUE [?] |
|---|---|---|---|---|---|---|
| GET 15% OFF FROM TRANQUILITY SPA MIAMI VIEW CAMPAIGN | 1,000 | 256 | 147 | $578 | $350 | 155% |
| GET 20% OFF FROM TRANQUILITY SPA MIAMI VIEW CAMPAIGN | 1,250 | 315 | 208 | $678 | $300 | 123% |
| SAVE 25% AT TRANQUILITY SPA MIAMI VIEW CAMPAIGN | 1,500 | 750 | 326 | $1,050 | $495 | 112% |

| Deal Dash, Inc. "4445000868893" | | | Open Date | Merchant Summary Report | | | |
|---|---|---|---|---|---|---|---|
| Settlement Type: D - Daily Bundled | | | Close Date | 12/1/12 - 2/28/13 | | | |
| Settlement - Summary | | | | | | | |
| MasterCard | | 50 | 500 | | | | |
| Settlement Rejects | | 0 | | | | | |
| Misc Adjustments | | 0 | | | | | |
| Misc Fees | | 0 | | | | | |
| | | | | | | | |
| Visa | | 50 | 500 | | | | |
| Settlement Rejects | | 0 | | | | | |
| Misc Adjustments | | 0 | | | | | |
| Misc Fees | | 0 | | | | | |
| | | | | | | | |
| Total Transactions for Settlement | | 100 | 1000 | | | | |
| | | | | | | | |
| Automatic Coupons Settled - Campaign A | | | | | | | |
| Discounts Applied | 10% off $50 | 3 | (4.50) | | | | |
| Coupon Fees | 10% net basket | 3 | (2.55) | 610 | | | |
| Automatic Coupons Settled - Campaign B | | | | | | | |
| Discounts Applied | 10% off $50 | 2 | (3.00) | | | | |
| Coupon Fees | 10% net basket | 2 | (1.70) | | | | |
| | | | | | | | |
| Net Settlement | | | 988.25 | | | | |
| ACH Deposits | | | 988.25 | | | | |
| | | | | | | | |
| Transaction Detail | | | | | | | |
| Process Date | Trans Date | Trans Type | Card Type | Account Number | Auth Code | Amount | |
| 2/28/2013 | 2/27/2013 | SALE | 4 - VISA | 431196XXXXXX4808 | "027512" | 10 | ... |
| 2/28/2013 | 2/27/2013 | SALE | 4 - VISA | 431196XXXXXX4808 | "027384" | 10 | ... |
| 2/28/2013 | 2/27/2013 | SALE | 1 - MASTERCARD | 546616XXXXXX2630 | 09731Z | 10 | ... |
| 2/28/2013 | 2/27/2013 | SALE | 1 - MASTERCARD | 548700XXXXXX2630 | 02468Z | 10 | ... |
| | | | | | | | |
| Total Sales Transaction Volume | | | | | | 1,000.00 | |

SECURE ELECTRONIC TRANSACTION AUTHORIZATION ON TOKENIZED IDENTIFIERS AND LOCATION DATA

CROSS REFERENCE TO RELATED APPLICATION

This application is a continuation of and claims the benefit of priority to U.S. patent application Ser. No. 14/504,725, filed on Oct. 2, 2014, which claims the benefit of U.S. provisional patent application Ser. No. 61/886,037, filed on Oct. 2, 2013, entitled, PLATFORM FOR PROMOTION MANAGEMENT AND REDEMPTION, all of which are incorporated by reference in their entireties.

TECHNICAL FIELD

The systems and methods described below relate generally to the field of management of promotions redeemable at point of sale terminals. More particularly, the systems and methods relate to the field of redeeming promotions at a merchant's point of sale terminal based on identifying indicia transmitted to an acquirer computing system by the point of sale terminal.

BACKGROUND

Coupons and other types of promotions or offers provide a means for a merchant to draw in new customers, build and maintain customer loyalty, and provide some data that is useful for market research and the like. Despite their benefits to merchants and consumers, it can be inconvenient to use coupons. Even if a coupon is obtained electronically from a website or other digital means, the coupon would conventionally need to be printed or, at the very least, stored as a graphic image that can be shown to a store clerk upon checkout.

BRIEF DESCRIPTION OF THE DRAWINGS

FIG. 8 depicts an example campaign report in accordance with one non-limiting embodiment.

FIG. 9 depicts an example settlement report in accordance with one non-limiting embodiment.

DETAILED DESCRIPTION

Figure 1:
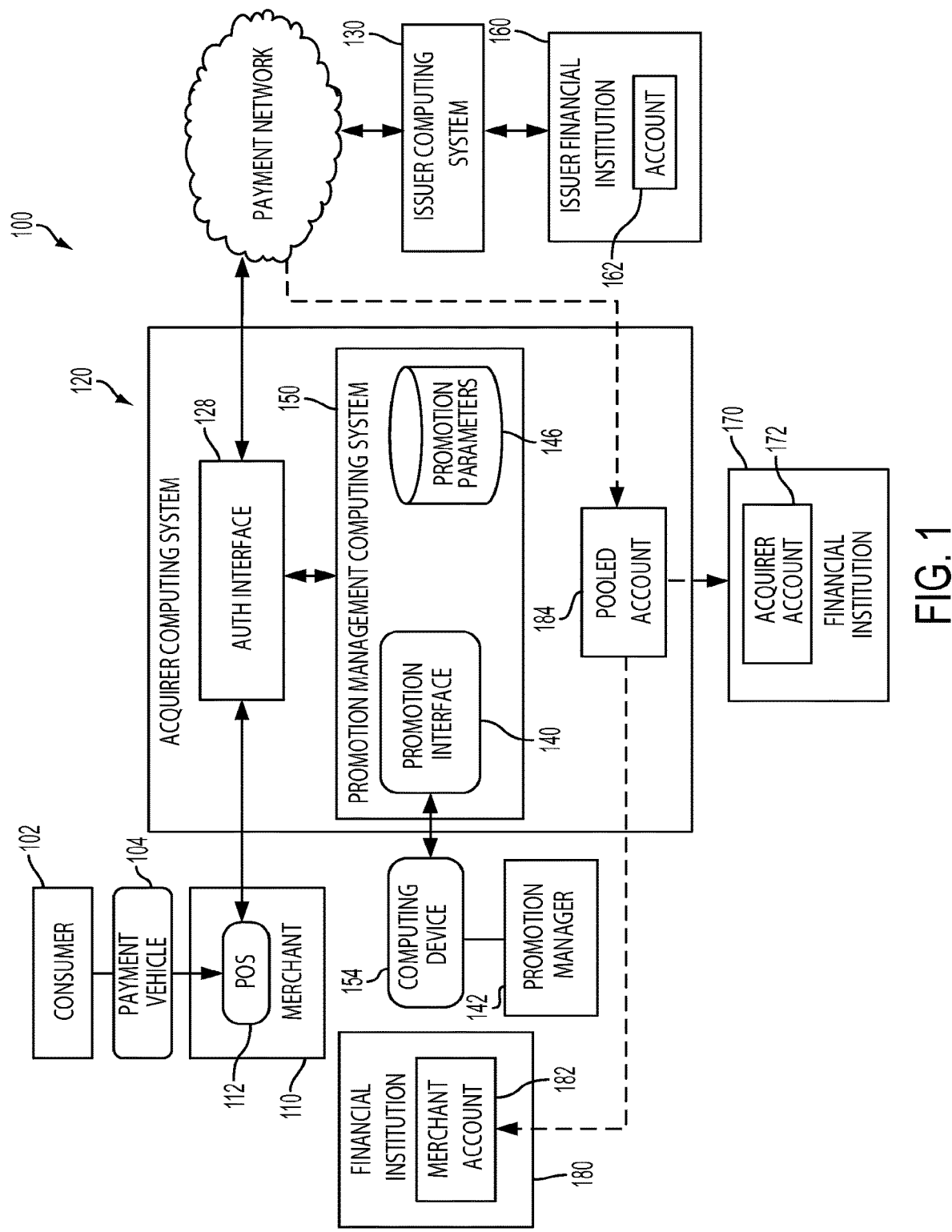
FIG. 1 depicts a block diagram of an example transactional-based promotion management system.

Various non-limiting embodiments of the present disclosure will now be described to provide an overall understanding of the principles of the structure, function, and use of systems and methods disclosed herein for the management of promotional offerings and providing the offer to a consumer at a merchant's point of sale terminal based on identifying indicia. One or more examples of these non-limiting embodiments are illustrated in the selected examples disclosed and described in detail with reference made to FIGS. 1-11 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Further-more, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

FIG. 1 depicts a block diagram of an example transactional-based promotion management system 100. The system comprises an acquirer computing system 120 that is configured to communicate point of sale (POS) systems 112 and communicate with one or more payment networks and issuer computing systems. For convenience, only one POS system 112 and one issuer computing system 130 is shown. Moreover, as used herein, the term POS system is used broadly to include POS system at brick and mortar locations and "virtual" POS system that can be associated with an online retailer or "in-app" purchases. In some cases, the POS system includes a terminal, or other network computing system which may be used to facilitate a payment transaction at a merchant location. The POS system 112 is affiliated with a merchant 110. The term merchant, as used herein, refers generally to any type of retailer, service provider, or any other type of business that is in networked communication with the acquirer computing system 120 and uses the payment processing services of the acquirer computing system 120. Payment processing services can include receiving and responding to authorization requests as well as facilitating the settlement of funds associated with card-based transactions occurring at the merchant 110.

In accordance with some embodiments, POS system 112 can generally be unmodified and simply facilitate the transmission of transaction-related information to the acquirer computing system 120, as is known in the art. The transaction-related information can comprise an authorization request as well as other types of identifying indicia. The identifying indicia can vary based on POS system 112, the type of merchant and the type of transaction, but example types of identifying indicia can include any of the following: a merchant identification (MID) identifier, a loyalty program identifier, a bank identification (BIN) identifier; a merchant category code (MCC) identifier; a media access control (MAC) identifier; an internet protocol (IP) identifier; a geographic identifier; a payment type identifier; and/or a consumer name or other consumer identifier.

A consumer 102, sometime referred to as a cardholder or card member, can provide information from a payment vehicle 104 to the POS system 112 to initiate a transaction with the merchant 110. Unless otherwise specified herein, "payment vehicle" includes a physical card including a plastic or paper card with a magnetic stripe, bar code or other indicator indicative of an account number or other account indicative information, and/or a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. Data associated with the card can include an encrypted or unencrypted account number or other encrypted or unencrypted account indicative information and/or encrypted or unencrypted information associated with a particular client, issuer, creator or group of merchants. It is also contemplated that the payment vehicle can have multiple embodiments or forms. For example, the payment vehicle can be a physical card (e.g., in the form of magnetic striped plastic card), a virtual card (e.g., in the form of a display on a smart phone), or both. The virtual card can be communicated by displaying a display or screen shot, and/or by transmitting a signal, such as by using NFC (Near Field Communication) technology or other secure transport technologies to complete the transaction with the selected merchants. Optionally, the virtual card can have a display element (e.g., a bar code or string of numbers) which identifies the account number associated with the card. Alternatively, the virtual card can have display elements relating to the merchants which accept the card. Thus, whether the payment vehicle is physical or virtual, it communicates account information.

In accordance with the present disclosure, the acquirer computing system 120 can also comprise a promotion management computing system 150 that can comprise one or more processor and instructions stored in memory. In some embodiments, the promotion management computing system 150 can provide a promotion interface 140 that is accessible by a promotion manager 142 through a computing device 154. The particular implementation of the promotion interface 140 can vary, but in some example embodiments, the promotion interface 140 is a webpage that allows a promotion manager 142 to input promotion parameters, review previously created promotions, select predesigned promotions, view existing promotions, and so forth. In any event, the promotion manager can provide or otherwise identify one or more promotions that can be applied to various transactions. The promotion manager 142 can be associated with, for example, the merchant 110, the issuer financial institution 160, or any other third party, such as a marketing entity. As described in more detail below, the parameters and type of promotion can vary, but in some examples the promotion comprises a segment definition that defines the customer base to which the promotion is applicable. Additional details regarding example interfaces and promotion configuration are provided below with regard to FIGS. 4-6. Generally, the segment definition can set the rules for determining how and when a promotion should be applied to a transaction and who the promotion should be provided to. In some embodiments, the promotion can be linked to a particular payment vehicle of a cardholder (i.e. based on account information) or the promotion can be more broadly linked to the consumer 102 and apply across a variety of payment vehicles associated with the consumer 102. The data regarding the promotions can be stored in one or more database 146. In some embodiments, the promotion interface 140 is provided by a specialized application that is executed on the computing device 154. Referring still to the acquirer computing system 120, subsequent to receiving parameters for one or more promotions, an authorization interface 128 can receive a first authorization request from the POS system 112. The first authorization request can comprises various data, including, for example, a MID, a MCC, an account identifier, and a first transaction amount. Once the authorization request is received, the promotion management computing system 150 can determine whether any promotional offerings are applicable to the first authorization request. The determination can be based on any number of factors, inputs, or parameters, as described in more detail below. In one example, for example, it is determined if the consumer 102 and the merchant 110 is within the segment definition of a promotion.

When a promotion is not applicable to the first authorization request, the acquirer computing system 120 can transmit an authorization request through the payment network to an issuer computing system 130, using conventional messaging. The authorization request provided to the payment network from the acquirer computing system 120 can identify the same amount of funds that was provided in the authorization request originally received from the POS system 112. By comparison, when a promotional offering is applicable to the first authorization request, the acquirer computing system 120 can modify the authorization request to generate an augmented authorization request. It is the augmented authorization request that is provided to the payment network and other entities within the payment ecosystem. The particular modification to any authorization request can be based on the terms of the promotion deemed to be applicable to the transaction. In one example, the promotion is a pricing discount such that the amount of funds that is requested by the acquirer computing system 120 from the issuer computing system 130 is less than the amount of funds originally requested from the POS system 112. For example, the amount of funds identified in the first authorization request may be reduced by a particular percentage or may be reduced by a particular dollar amount to determine the amount to be identified in the second authorization request. In this fashion, since the promotion can be applied with the payment stream, the application of the promotion and augmentation of the terms of the authorization requests are generally transparent to entities both downstream of the acquirer computing system 120 (i.e. the POS system 112) and entities upstream of the acquirer computing system 120 (i.e. the payment network and the issuer computing system 130).

In conventional fashion, the issuer processor system 130 can respond to the modified authorization request with an approval, a denial, or other suitable type of response. The acquirer computing system 120 can, in turn, provide a response to the POS system 112. In the case of an authorization approval, the amount identified in the authorization response from the acquirer computing system 120 can be lower than the amount of funds originally sought to be authorized by the POS system 112, due to the application of the promotion. Therefore, additional messaging can be provided by the acquirer computing system 120 to the POS system 112 to resolve that discrepancy and allow the POS system 112 to complete the transaction.

Figure 2:
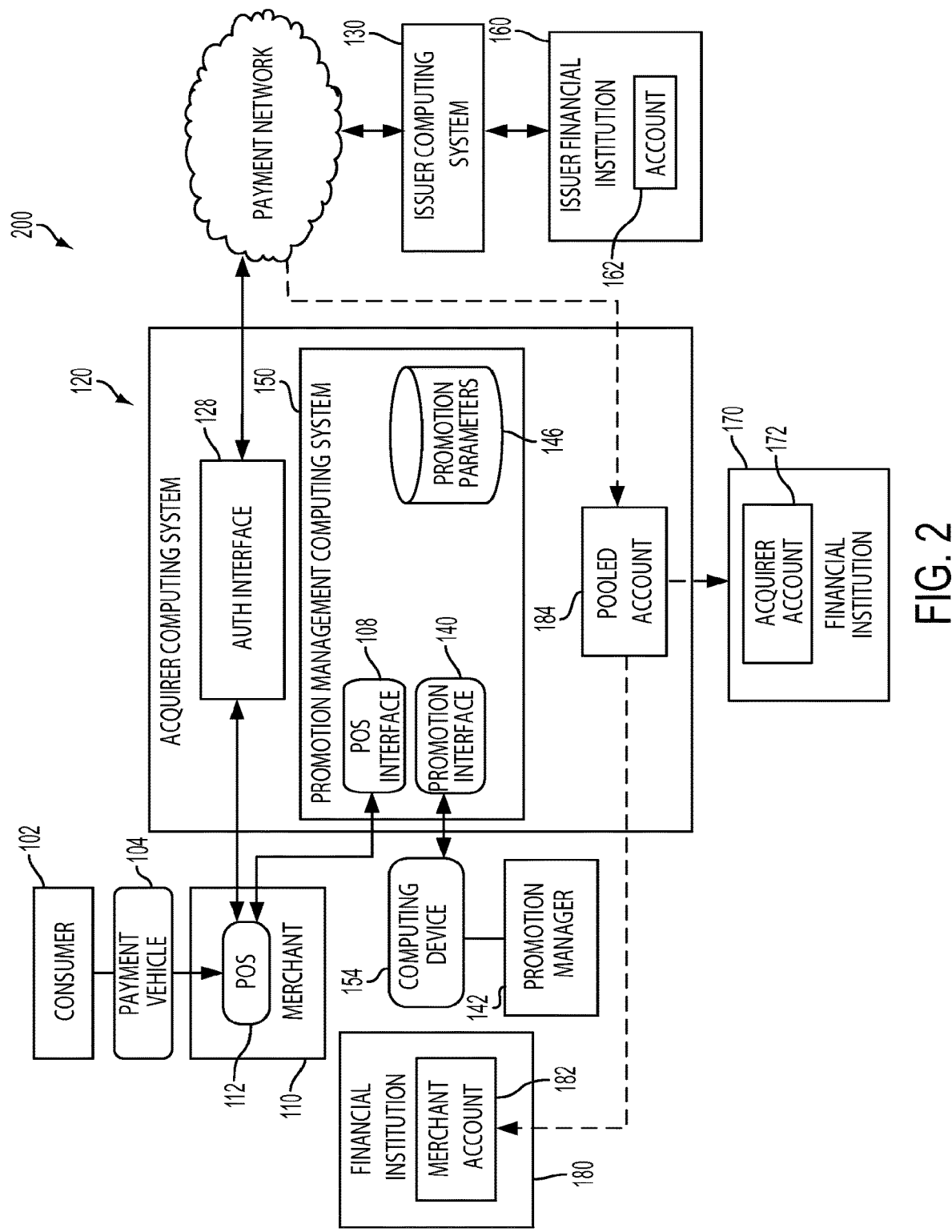
FIG. 2 depicts a block diagram of another example transactional-based promotion management system in which a point of sale system is configured to submit promotion queries to an acquirer computing system.

Subsequent to a successful financial transaction at the merchant 110, a settlement event can eventually occur that generally transfers funds from the account 162 that is linked to the payment vehicle 104 to at least an account 172 linked to the acquirer computing system 120 and an account 182 linked to the merchant 110. The accounts 172, 182 can each be maintained by financial institutions 170, 180, respectively, as schematically shown in FIG. 1. As indicated by the dashed lines on FIG. 1, settled funds can be routed from the payment network to a pooled account 184 of the acquirer computing system 120. Various processing fees and charges can be transferred into the acquirer account 172. These fees can be based on the costs of the acquiring the transaction on behalf of the merchant 110, and if a promotion was applicable, additional fees can be levied by the acquirer computing system 120 based on the costs of the promotion management and redemption services. The remainder of the funds can be settled to the merchant account 182, or any other suitable account. The settlement process described above is sometimes referred to herein as a net settlement process. FIG. 2 depicts a block diagram of another example transactional-based promotion management system 500. In this example embodiment, the POS system 112 is specially configured communicate with the promotion management computing system 150 to allowing messaging beyond conventional authorization requests. In this embodiment, the POS system 112 can query the promotion management computing system 150 to ascertain whether a promotion is applicable to a particular transaction. The POS system 112 can be adapted or modified with specialized software to facilitate this additional communication with the acquiring computing system 120. In some embodiments, the POS system 112 sends a promotion query to the acquiring computing system 120 prior to sending a conventional authorization request to the acquiring computing system 120. The promotion management computing system 150 can determine if a promotion is applicable a response can be provided to the POS system 112. In some embodiments, the consumer 102 can be presented with the promotion at the POS system 112 and provide an input as to whether the wish to apply the promotion to the pending transaction. If the consumer 102 desires to apply the promotion, the POS system 112 can apply the promotion to the transaction before forming the authentication request. In other embodiments, the POS system 112 can automatically apply the promotion and internally modify the amount sought in the authorization request and transmit the modified amount to the authorization interface 128 of the acquirer computing system 120. Therefore, in accordance with the present disclosure, the initial request from the POS system 112 can be either a fully form authorization request, as in known in the art, or the initial request can be a promotion query. If the initial request from the POS system 112 is a promotion query, based on the response it receives, it from the authorization request accordingly.

Figure 3:
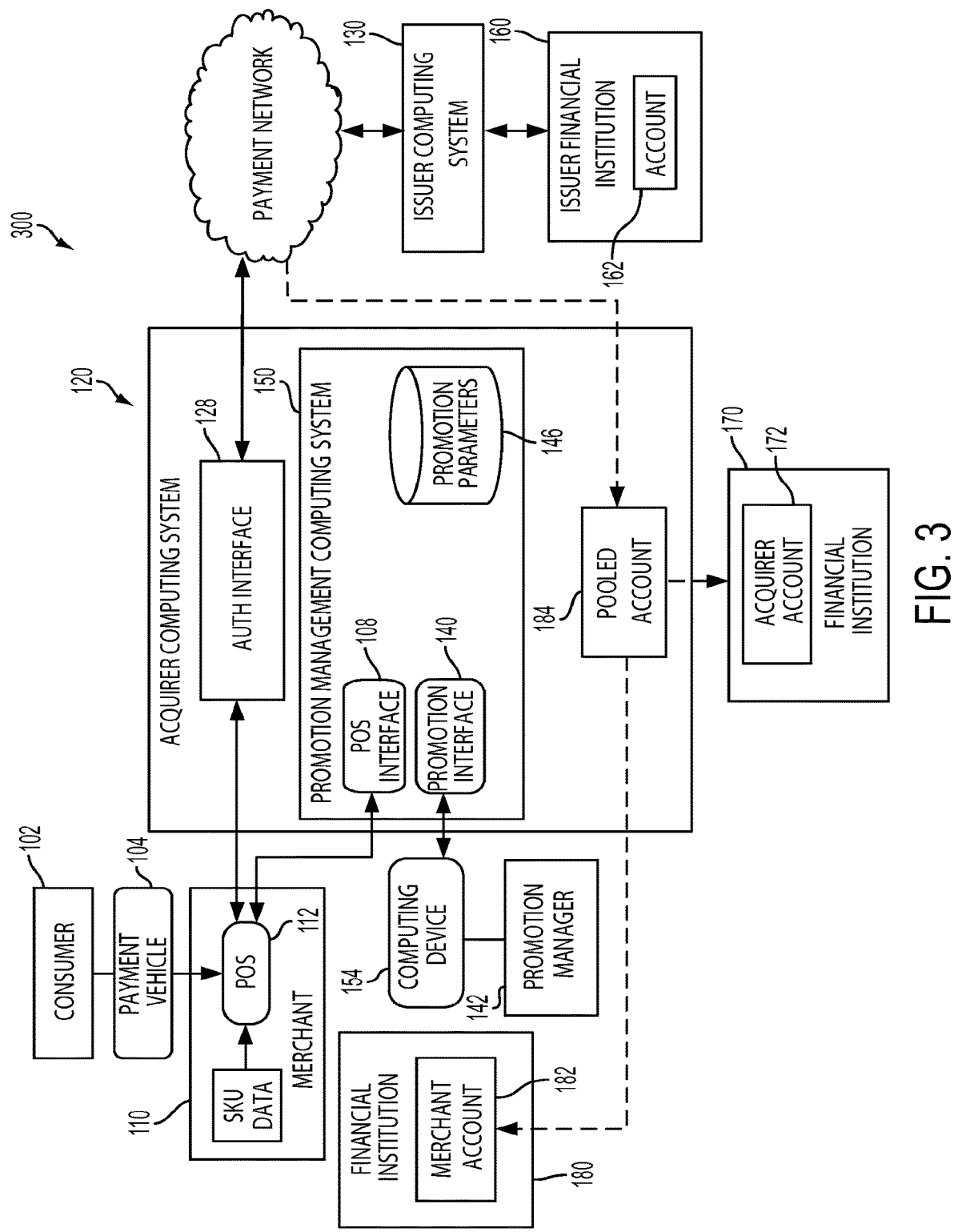
FIG. 3 depicts a block diagram of another example transactional-based promotion management system in which stock keeping unit data is utilized to determine promotion applicability.

FIG. 3 depicts a block diagram of yet another example transactional-based promotion management system 600. In this example embodiment, the POS system 112 is again configured communicate with the promotion management computing system 150 to ascertain whether a promotion is applicable to a particular transaction. In this embodiment, however, stock keeping unit (SKU) data is provided to the promotion management computing system 150 in the promotion query. The promotion applicability can be based on any of the previously described parameters and additionally or alternatively it can be based on the SKU data. Using the SKU data as a promotion parameter, a wide array of promotions can be offered by merchants, manufacturers, marketers, card issuers, and so forth. For example, the purchase of certain products or combination of products can automatically unlock certain promotions for a consumer 102. Moreover, in some embodiments, a combination of products purchased over a certain time frame at one or more merchants can automatically unlock certain promotions for a consumer 102. Thus, using SKU level data as a parameter provides the promotion management computing system 150 with a finer level of granularity than may be available using only information that is contained with a conventional authorization request. Similar to above, if it is determined that a promotion is applicable to a particular transaction, the POS system 112 can then internally modify the amount sought in the authorization request and transmit the modified amount to the authorization interface 128 of the acquirer computing system 120, as described above.

Figure 4:
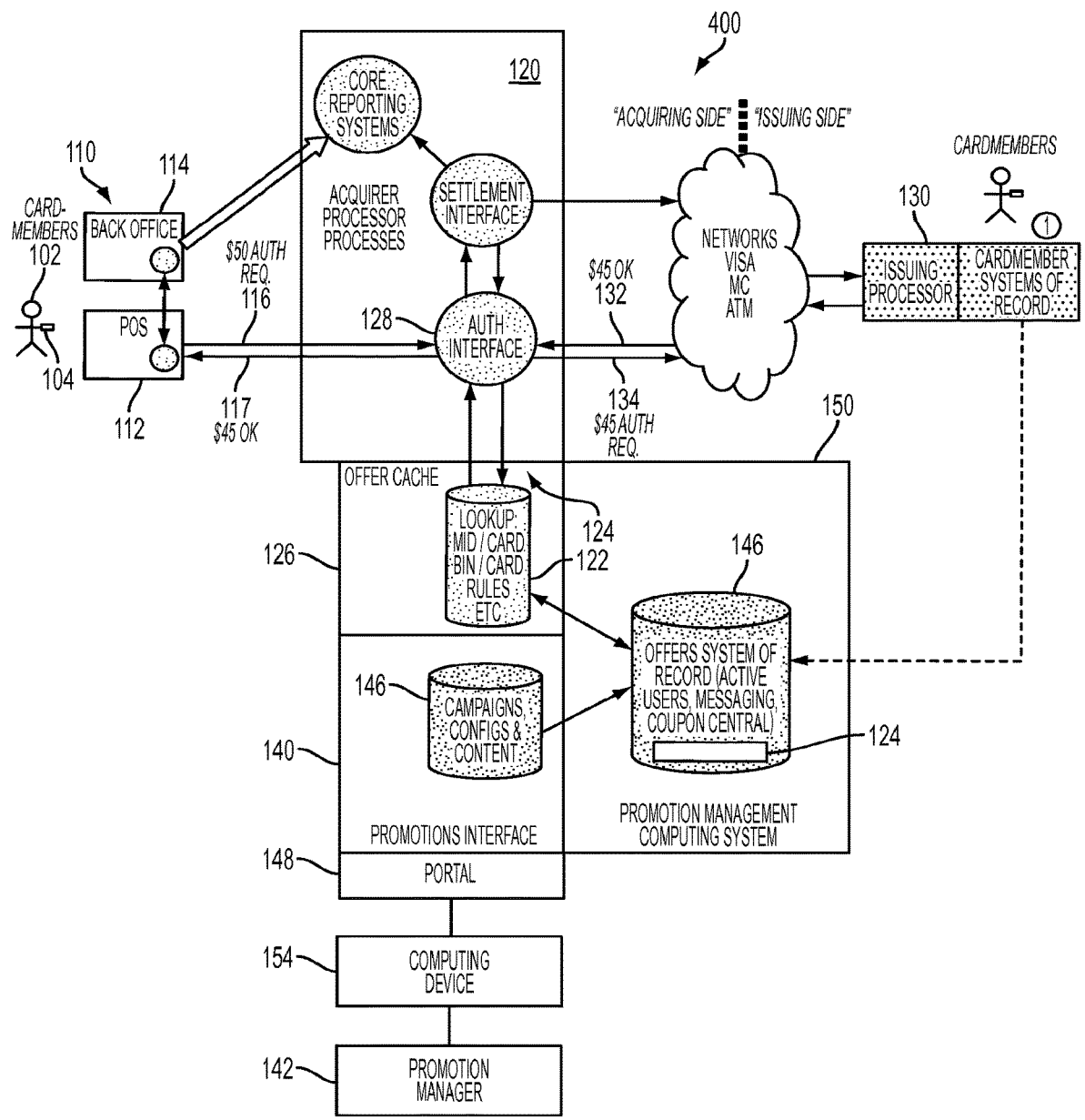
FIG. 4 depicts a process communication diagram of a system in accordance with one non-limiting embodiment.

FIG. 4 depicts a process communication diagram for an example system 400 in accordance with one non-limiting embodiment. In the example system, and similar to the embodiments described above, a consumer (illustrated as cardmember 102) purchases one or more items or services from a merchant 110 at a point of sale system 112 of the merchant 110. The cardmember 102 initiates the transaction using a payment vehicle 104 issued by an issuer financial institution 160 (FIG. 1) and processed by credit card issuer 130. The point of sale system 112 requests authorization 116 for the purchase from the acquirer computing system 120. The acquirer computing system 120 can review identifying indicia 122 associated with the cardmember 102 and/or payment vehicle 104 to determine if a qualifying promotion 124 can be applied to the transaction, for example by comparing the identifying indicia 122 with data in the promotion database 146. The qualifying promotion 124 can then be applied to the transaction.

In an embodiment, qualifying promotions 124 can be set up through a promotion management computing system 150 associated with the acquirer computing system 120. In some embodiments the acquirer computing system 120 is the promotion management computing system 150. In other embodiments, the promotion management computing system 150 is a component or module of the acquirer computing system 120. A promotion manager 142 can access the promotion management computing system 150 through promotion interfaces 140 and enter campaign configurations and content which is used to set up qualifying promotions 124. Qualifying promotions 124 can be, for example, part of marketing campaigns or research campaigns that can be stored on a campaign database 146. A promotion manager 142 can be, without limitation, a merchant user that desires to offer a discount or other promotion to cardmembers 102. Alternatively, the promotion manager 142 can be a financial institution user that desires to offer a discount or other promotion to cardmembers 102. The promotion manager 142 can set up qualifying promotions 124 via a merchant offer portal 148 associated with the promotion interfaces 140.

In an embodiment, the promotion management computing system 150 can provide customized segmentation of data associated with the cardmember 102 or payment vehicle 104 to the promotion manager 142. The system 400 can be configured such that personally identifiable information (PII) associated with the cardmember 102 or payment vehicle 104 is accessible only to the credit card issuer 130 or other entities. However, personally identifiable information (PII) associated with the cardmember 102 or payment vehicle 104 that is needed for completing and documenting the transaction, for example card and transactional data required for real-time processing with the point of sale system 112, can be retained by the merchant 110 and/or acquirer computing system 120. Generally the data can be segmented such that the promotion manager 142 receives only anonymized data regarding the cardmember 102 or payment vehicle 104 used in the transaction. The rate at which that data is provided to the promotion management computing system 150 can be configurable.

In an embodiment, the acquirer computing system 120 performs all, some, or none of the functions of validating and redeeming qualifying promotions 124. By having the acquirer computing system 120 perform all the functions, however, the system 400 advantageously places computer assets and processes that support the redemption of offers in-stream with the authorization process for processing the original transaction between the point of sale system 112 and the acquirer computing system 120. This configuration may advantageously reduce or eliminate potential latency risks in the system, retain competitive transaction response times for merchants 110, and enhance the experience of the cardmember 102. The acquirer computing system 120 can retain all records of redemptions of qualifying promotions 124 and act as a trusted third part agent for the credit card issuer 130 and/or promotion manager 142.

In an embodiment, the promotion management computing system 150 and promotion interfaces 140 can provide the merchant 110 and/or promotion manager 142 the ability to input customer information to the system 400. For example, consumer information can be entered by the merchant user 118 and/or promotion manager 142 into a database, such as the campaign database 146. Example consumer information can include loyalty data, or other information which may be helpful in identifying particular segments of cardholders. The promotion management computing system 150 and promotion interfaces 140 can provide customized segmentation of the data such that the credit card issuer 130 is not provided with data from any other data sources external to consumer information that is already available to the credit card issuer 130. The credit card issuer 130 thereby is only exposed to customer and consumer data that is in its direct control.

In an example configuration, based on a marketing campaign for a particular qualifying promotion 124, the credit card issuer 130 provides anonymized and aggregated transaction data to the promotion management computing system 150, as indicated by the dashed lined in FIG. 4. For example, demographic data or other identifying data associated with the transactions may be retained by the credit card issuer 130. However, transactional data that can be used for a baseline segment definition can be provided to the promotion management computing system 150. In a first example, the baseline segment definition can be based upon data elements that include the card number (tokenized) of the payment vehicle 104 and the ZIP code (five digit) of the cardmember 102. This provides an overlay for transaction data that can capture inactive cardmembers 102 with the ZIP being used to enable geographic targeting when historical transaction data is not present and a purchasing radius ZIP cannot be derived. In a second example, the baseline segment definition can be based upon data elements that include the card number (tokenized) of the payment vehicle 104, the merchant ID or MID from the transaction, the merchant descriptor, the merchant category code or MCC, the dollar amount of the transactions, the date, the time, and the ZIP code (five digit) of the merchant 110. This provides baseline transaction history to enable canned segmentation and targeting within the credit card issuer 130 portfolio using transaction-derived segmentation and list selection that is pushed to the credit card issuer 130 for offer publication. The ZIP code of the merchant 110 can be used to derive a purchasing radius geography to enable geo-targeted offers of qualifying promotions 124. In still other configurations, this information can be combined with other data sources, such as third party data sources known in the art, to enable enhanced targeting of offers of qualifying promotions 124 to targeted consumers. The credit card issuer 130 can provide the data to the promotion manager 142 sorted according to desired baseline segments. The credit card issuer 130 can be accountable for the selection of the baseline segmentation and can receive input from the promotion manager 142 about how best model the available data to achieve the desired baseline segmentation. Although merchants 110, merchant users 118, and promotion managers 142 can select target consumers using the baseline segment definitions offered by the credit card issuer, they will not have direct visibility to the underlying transactional data. Policy and process controls configured by the credit card issuer 130 on the promotion management computing system 150 can unsure that PII associated with cardmembers 102 cannot be derived or extrapolated using the segment definitions and associated offers of qualifying promotions 124 or their redemption.

A promotion manager 142 can initiate a marketing campaign by setting up an offer through interactions with the promotion management computing system 150 using the promotion interfaces 140, or directly though a customized campaign build. Once a marketing campaign is finalized, the campaign can be submitted into the promotion management computing system 150 to enable execution. Using the promotion interfaces 140, the promotion manager 142 can define the offer, set the parameters and rules, and assign the target segments of consumers or cardmember 102 to receive the offer. Preset offer types and rules can be made available to the promotion manager 142, which can subject to the approval of the credit card issuer 130 before the campaign is activated. Example parameters include the offer type, publication and expiration dates, and the marketing media for disseminating the offer. The offer type can be, for example, a prepaid offer, a percentage off discount, a dollar discount, among other offer types. The marketing media can include the offer messaging and promotional copy, for example the descriptive language that accompanies the offer itself. Pre-set copy can be provided from a library and can be sorted and displayed by merchant category. The pre-set copy can be customized, and can be subject to the approval of the credit card issuer 130, or other entity.

The target segments of consumers or cardmember 102 that are to receive the offer can be pre-defined. Example pre-defined segments can include new cardmembers 102, existing cardmembers 102, cardmembers 102 who have shopped at the merchant 110 previously within a configurable period of time (e.g., within the last 6 months, or within a configurable window of time), cardmembers 102 who have shopped within a geographic radius (e.g., within a derived ZIP of their transaction history), segments based on past transaction history (e.g., cardmembers 102 who have made a purchase within a configurable category within a configurable period of time), segments based on advanced segmentation rules (e.g., best cardmembers 102, inactive cardmembers 102, cardmembers 102 categorized as "soon to attrite", etc.), among other segments.

The promotion management computing system 150 can restrict the visibility of the promotion manager 142 to only the aggregate segment definition and a total count of cardmembers 102 within the segment definition. Further, additional segment definition rules and controls can be applied to retain PII and anonymity of the cardmembers 102, and prevent direct or indirect visibility by the promotion manager 142 of restricted segments characteristics. In a configuration, promotion management computing system 150 can inhibit the identification of cardmembers 102 in a particular segment. For example, a campaign that provides offers to three segments can present the same offer value such that the value of the discount does not inform the promotion manager 142 as to which segment cardmembers 102 belong at the time the qualifying promotion 124 is redeemed.

The promotion management computing system 150 can be configured to facilitate use by national or regional merchants 110 that have existing customer relationship management systems or CRM systems, loyalty databases, or existing segmentation models. The campaign definition can permit receipt of merchant 110 data via a customized campaign into the promotion management computing system 150. The merchant 110 data can be segmented from the credit card issuer 130 such that neither can see nor manipulate the other's data directly. The segmentation rules can be overlaid with the credit card issuer 130 data to enable more customized segmentation and targeting with the credit card issuer 130 portfolio. Merchant 110 visibility can be restricted to aggregate segment definitions as described herein, and can be subject to the same controls that prevent direct and indirect visibility into restrict data characteristics. The campaigns for national or regional merchants 110 can conform to the overall constraints of the system 400 as described herein.

Once the marketing campaign is submitted into the promotion management computing system 150, it can be queued for approval by the credit card issuer 130 or other approving entity. A marketing campaign definition can be predefined to minimize exception handling and merchant 110 remediation.

Once the marketing campaign is approved or otherwise available for use, the marketing campaign can be made available to other processes of the promotion management computing system 150 for publication and redemption. To improve response times and maintain required service levels, summary level campaign data, and other marketing campaign data, can be provided to the acquirer computing system 120 in an offer cache. The offers of the marketing campaign, including the offer messaging and promotional copy, can be published to cardmembers 102 using a suitable communications channel. For example, suitable communications channels can include messages sent through an online portal, for example to the accounts of cardmembers 102 on the website of the credit card issuer 130, email messages, a short message service or SMS message, a message from a web log, phone, voicemail, or other audible messages, among other suitable communication channels known, in development, or yet to be invented. In some embodiments, the cardmembers 102 can be required to accept an offer to link the offer to their payment vehicle 104 in order to qualify for the promotion. Such acceptance can be provided using any suitable technique, such as by activating or selecting a particular graphical element on a website, replying to a SMS message, or otherwise electronically communicating an acceptance of the offer.

Once the offer is available in the offers cache 126 of the acquirer computing system 120, the offer can be made available to cardmembers 102 when they used their payment vehicle 104 at a point of sale system 112 of a merchant 110. When the payment vehicle 104 that is linked to the offer is swiped, or otherwise entered, at the point of sale system 112, the point of sale system 112 constructs and transmits an authorization request 116 to the acquirer computing system 120. In other embodiments, instead of the swiping of the payment vehicle 104, the acquirer computing system 120 can receive information about a potential redemption of an offer, or identification of the customer, through "pre-swipe" customer identification where technology, channel, and compliance and disclosure requirements permit. For example, the acquirer computing system 120 can receive the information through merchant loyalty card swipes at retail or restaurant establishments. In other examples, the cardmember 102 can check in to a particular retail or restaurant establishment and back office systems 114 of the retail or restaurant establishment can provide information to the acquirer computing system 120. In yet another example, the cardmember 102 can perform actions that subsequently provide information to the acquirer computing system 120, for example by using apps on a mobile device, or by clicking links in email or a web browser to activate offers. The information can also be received through location or other information. For example, a mobile device can provide information through GPS or near field communication devices to indicated when the cardmember 102 is nearby to, or within, particular retail or restaurant establishments.

Once the acquirer computing system 120 receives an authorization request 116 from the point of sale system 112, the transaction information is compared to data in the offers cache 126 by an authorization interface 128. In a configuration, the transaction information from the authorization request 116 is first compared to the Bank Identification Number or BIN associated with the credit card issuer 130 and/or the Merchant ID or MID. If there is a match, the transaction information is then compared to the rules in the offers cache to determine if a qualifying promotion 124 is available.

If a qualifying promotion 124 is available, the rules of the qualifying promotion 124 are applied to the transaction. In a configuration, the transaction can be modified before the transaction is communicated through the payment networks. For example, if the authorization request 116 was for a $50 purchase, and the qualifying promotion 124 applied a 10% or $5 credit, then the acquirer computing system 120 can modify the transaction such that the Bank Authorization request or BAU request 132 reduces the authorization request 116 to $45 instead of the original $50. In a configuration, a split tender messaging model can be used wherein the authorization request 116 is the original amount of $50 but the authorization response 117 is split into two separate authorization responses 117, a first authorization response 117 of $45 and a second authorization response of $5. The split tender messaging model can be used if the point of sale system 112 is configured to process this type of messaging.

The acquirer computing system 120 can send the reduced BAU request 132 to the credit card issuer 130, and receives back an BAU response 134, for example an OK response. The acquirer computing system 120 can then "burns" the offer to mark that the qualifying promotion 124 has been redeemed, so that the offer will not apply to any future transactions. In addition, the acquirer computing system 120 can enable receipt level messaging such that the authorization response 117 sent from the acquirer computing system 120 to the point of sale system 112 includes information about the original authorization request 116 and/or the qualifying promotion 124 with the authorization response 117. In other configurations, the qualifying promotion 124 can be configured to be an "always on" offer that is not burned upon use. In yet other configurations, the qualifying promotion 124 can be configured to be a loyalty or frequency type reward that is earned over multiple transactions or based on spending thresholds, for example reaching a certain dollar number of expenditures within a configurable window. Other suitable rules can be configured in offers cache 126 of the acquirer computing system 120.

The authorization response 117 can be provided to the point of sale system 112 of the merchant 110 by the acquirer computing system 120, including notification of the gross and net transaction amounts, the discount value, and any supplemental messaging. This information can be presented on the receipt that is provided to the cardmember, which advantageously provides immediate confirmation to the cardmember 102 that the qualifying promotion 124 was applied to their purchase. The cardmember 102 is billed the reduced amount of the authorization response 117 by the credit card issuer 130, rather than, for example, being billed the original gross amount of the authorization request 116 and then receiving a credit.

In a configuration, a back office system 114 and/or the point of sale system 112 of the merchant 110 can handle and reconcile the variance between the original gross amount in the authorization request 116 and the amount in the authorization response 117, if it has been reduced from the gross amount. In various configurations, this reconciliation can include any number of suitable processes, including but not limited to preauthorization whereby the offer matching is executing in a standalone process prior to the authorization request 116 and authorization response 117 being generated and transmitted (see FIG. 5 and the accompanying description below).

When the offer is redeemed as a qualifying promotion 124, the acquirer computing system 120 can deliver a real-time event to the promotion management computing system 150 to indicate that the offer has been redeemed. This can include notification that the offer has been burned and is no longer available for subsequent redemption. The promotion management computing system 150 and/or the promotion interfaces 140 can send a message to the cardmember 102, as described above, to notify the cardmember 102 of the redemption of the offer.

The promotion management computing system 150 can provide campaign analytics and has settlement reporting capabilities. The promotion management computing system 150 can provide campaign reports to the promotion manager 142, for example through the merchant offer portal 148. An example campaign report 800 is presented in FIG. 8. Campaign reports 800 can provide aggregated visibility into campaign performance and the economic impact of the marketing campaign. In a first configuration, the promotion manager 142 can receive aggregated campaign performance, rather than individual transaction detail. For example, a summary can include the total size of the targeted population of cardmembers 102 for each marketing campaign. The marketing campaign can be designed to obfuscate individual cardmember 102 identification. The aggregated redemption report can exclude PII, payment vehicle 104 information, or cross references to a cardmembers 102 inclusion in one or more segments. Additional, the summary can include geographic disbursements of transactions and/or respondents to the campaign, maps including maps that show the radius from which customers travel to transact at the merchant 110, and derived ZIP information about cardmembers 102, and can be derived from the ZIP of the billing address of cardmembers 102 and/or the ZIP of merchant transactions for the cardmembers 102. In a second configuration, the promotion manager 142 can receive customized analytics and reporting. For example, where the merchant 110 has multiple locations, such as would be the case for a national or regional merchant 110, the summaries could be subdivided into appropriate segments according to regions or other logical groupings. In a third configuration, the promotion manager 142 can receive individual transaction details, however generally this is the case when the promotion manager 142 is the credit card issuer 130, or where the databases of customer information were previously shared between the promotion manager 142 is the credit card issuer 130.

The promotion management computing system 150 can provide settlement reports. An example settlement report 900 is presented in FIG. 9. Settlement reports 900 enable financial reconciliation of transaction discounts and fees in concert with BAU settlement accounting and can enable the acquirer computing system 120 to bill for services provided in connection with the marketing promotions. Campaign and offer redemption reports 610 can be configured to provide aggregated level reporting to enable financial reconciliation of redeemed discounts and associated redemption fees. For merchants 110 that are running multiple coterminous marketing campaigns, the reporting can be provided at a campaign level to enable discrete accounting, for example to account for how the campaigns are designed and funded by the merchants 110. Controls on the campaign design can prevent direct or indirect extraction of cardmember 102 data as described herein. For example, redemption data at the transaction level can be excluded in order to obfuscated membership by an individual cardmember 102 in one or more defined segments. The settlement report 900 can include transaction level detail 620. Transaction level details can be included in the report and can include masked card data (tokenized card numbers) and BAU data. However, the transactions level details 620 generally will not indicate which of the transactions involved the redemption of a qualifying promotion 124.

The credit card issuer 130 can receive detailed cardmember 102 level campaign analytics with full access to redemption detail. Such analytics can enable better cardmember service. The analytics can be tied directly to the offer system of record in a manner that provides full visibility of cardmember 102 transactions and redemption activity.

Figure 5:
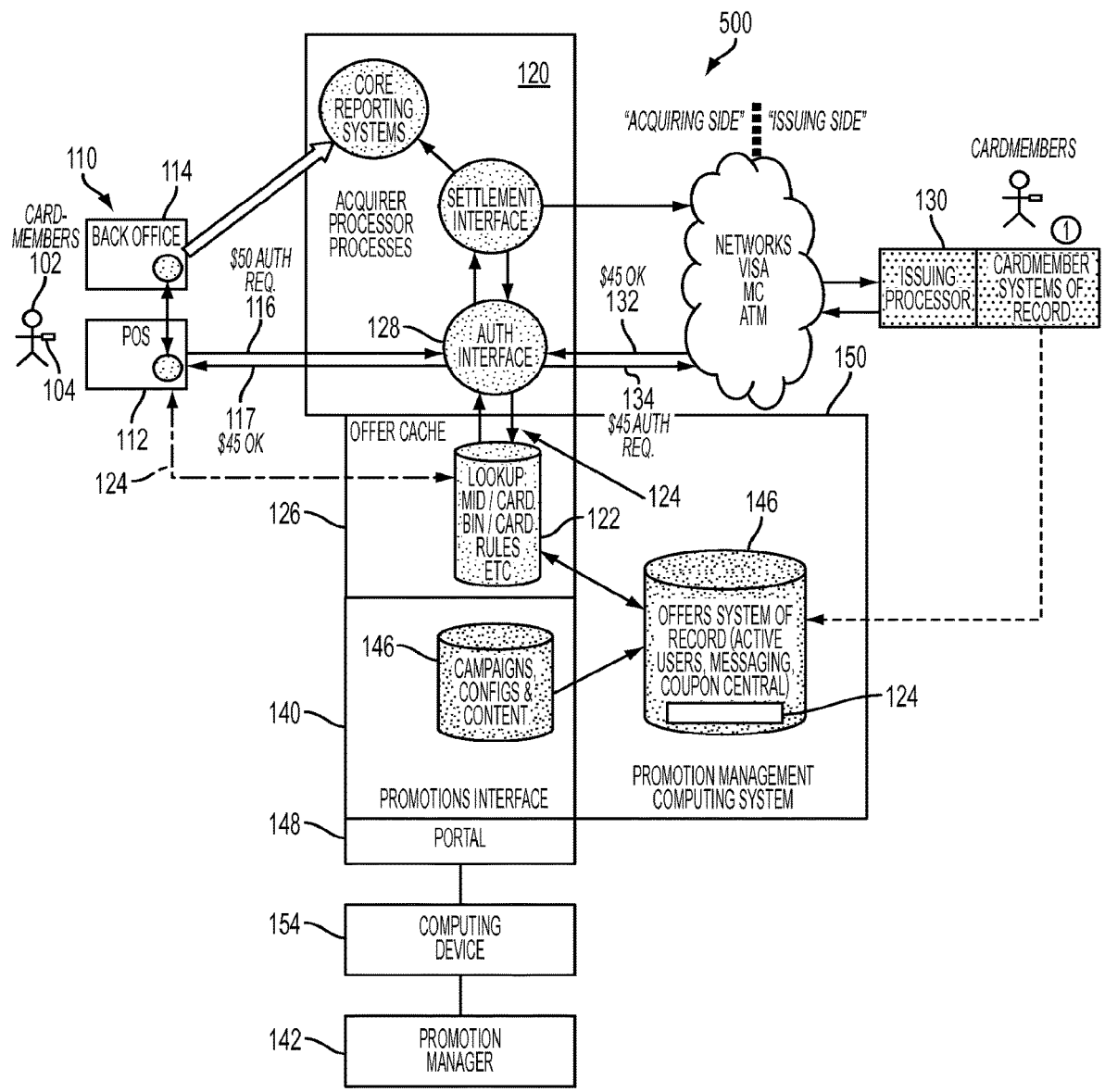
FIG. 5 depicts a process communication diagram of a system in accordance with another non-limiting embodiment.

In FIG. 5, a block diagram of a system in accordance with another non-limiting embodiment. The system of FIG. 5 differs from the system of FIG. 4 in that the reconciliation of the promotional discount occurs at the point of sale system 112 prior to sending the authorization request 116 to the acquirer computing system 120. When the payment vehicle 104 is swiped at the point of sale system 112, the point of sale system 112 first sends the transaction information to the offers cache 126, for example using an application programming interface or API associated with the offers cache 126. The transaction information is compared to data in the offers cache 126 as described above for FIG. 4. If there a qualifying promotion 124 is available, the offers cache 126 applies the rules of the qualifying promotion 124 to the transaction and sends the modified transaction information to the point of sale system 112.

In an embodiment, the point of sale system 112 can present an option to the cardmember 102 to accept or decline the modification. If the cardmember 102 declines the modification, the point of sale system 112 can notify the offers cache 126 that the qualifying promotion 124 was not redeemed and the offers cache 126 will not burn the offer.

The point of sale system 112 then sends the authorization request 116 to the acquirer computing system 120 using the modified transaction information. When the acquirer computing system 120 receives an authorization request 116 from the point of sale system 112, the qualifying promotion 124 has already been applied to the transaction such that the Bank Authorization request or BAU request 132 can be directly generated from the amount in the authorization request 116. The operation of the system of FIG. 2 otherwise operates similarly to that of FIG. 1.

Figure 6:
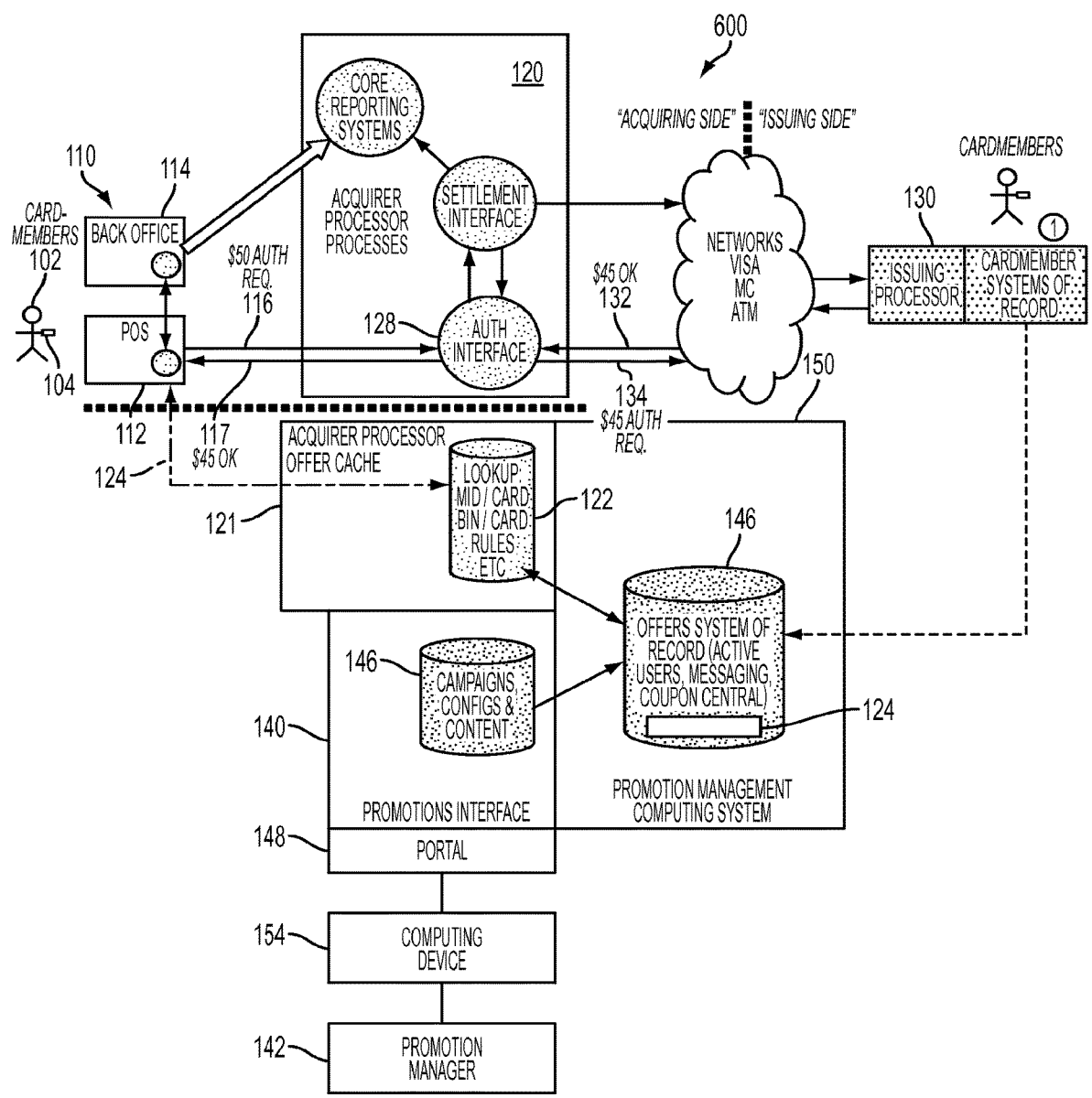
FIG. 6 depicts a process communication diagram of a system in accordance with yet another non-limiting embodiment.
Figure 7:
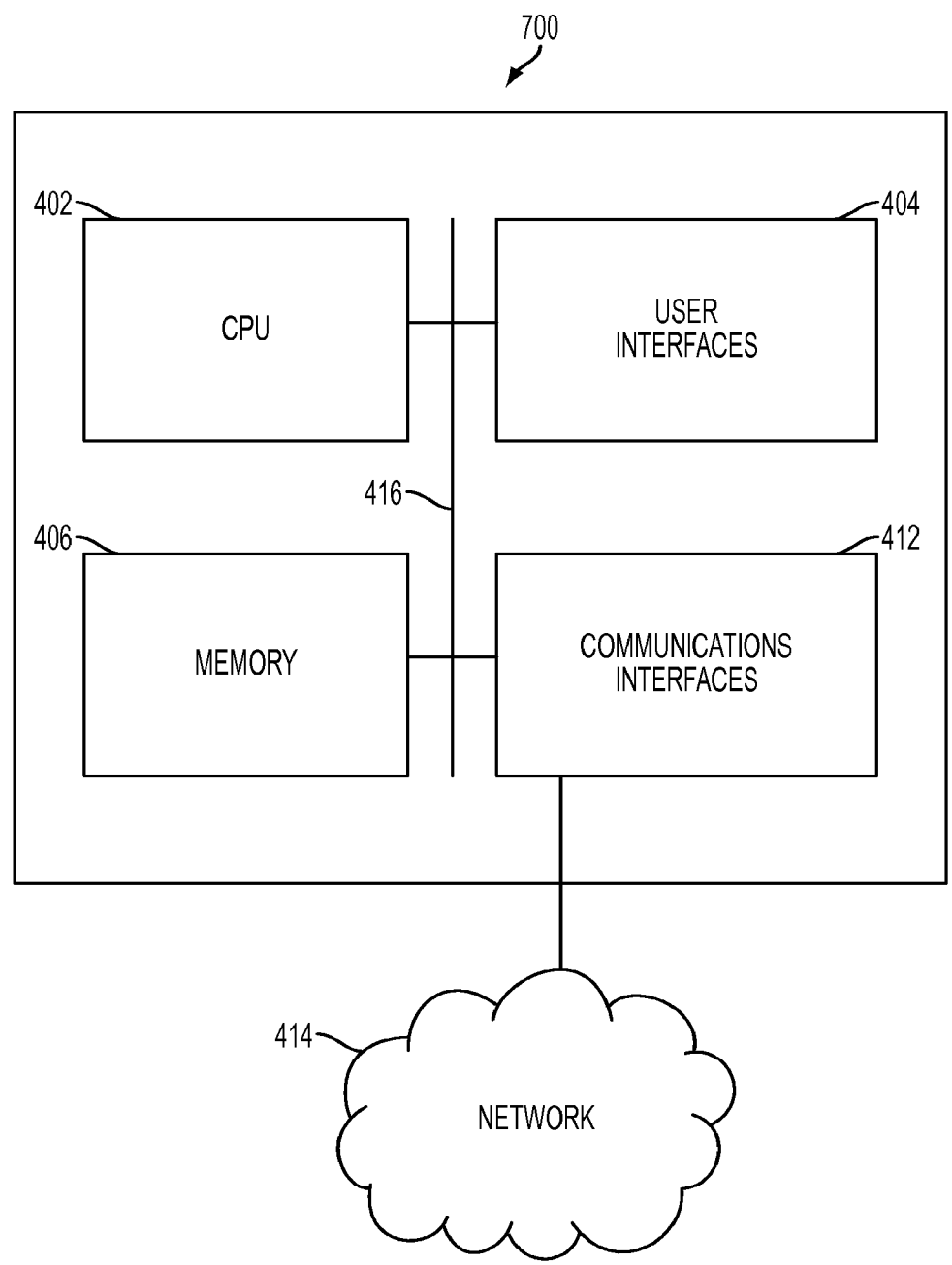
FIG. 7 depicts an example computing device of the system.

In FIG. 6, a block diagram of a system in accordance with a third aspect of the invention is presented. The system of FIG. 3 differs from the system of FIG. 2 in that the offers cache 126 is associated with a separate offer processor 121 that is different from the acquirer computing system 120 that mediates the transaction between the point of sale system 112 and the credit card issuer 130. The operation of the system of FIG. 6 otherwise operates similarly to that of FIG. 5.

Figure 10:
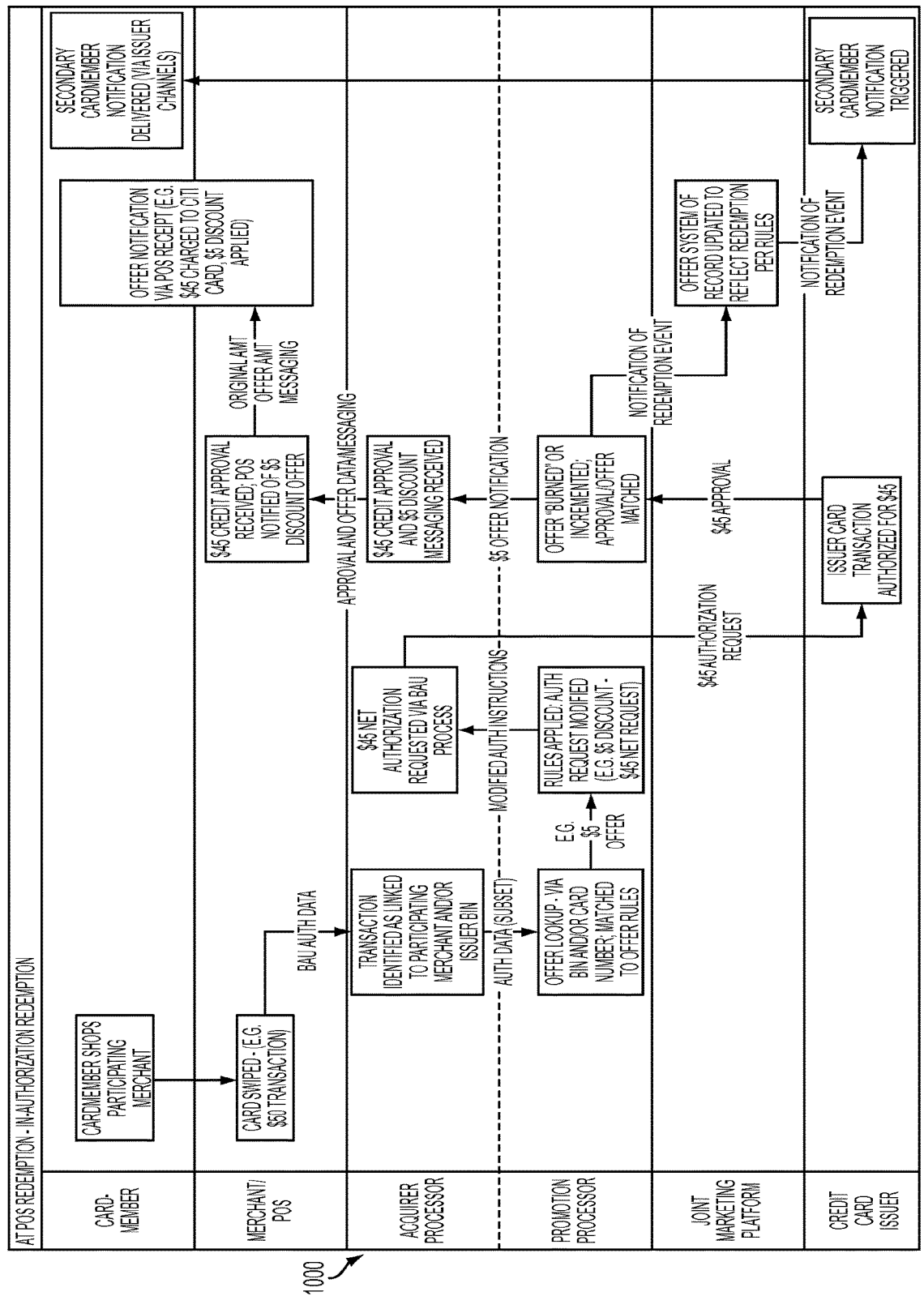
FIG. 10 depicts an example flow diagram of a system in accordance with one non-limiting embodiment.
Figure 11:
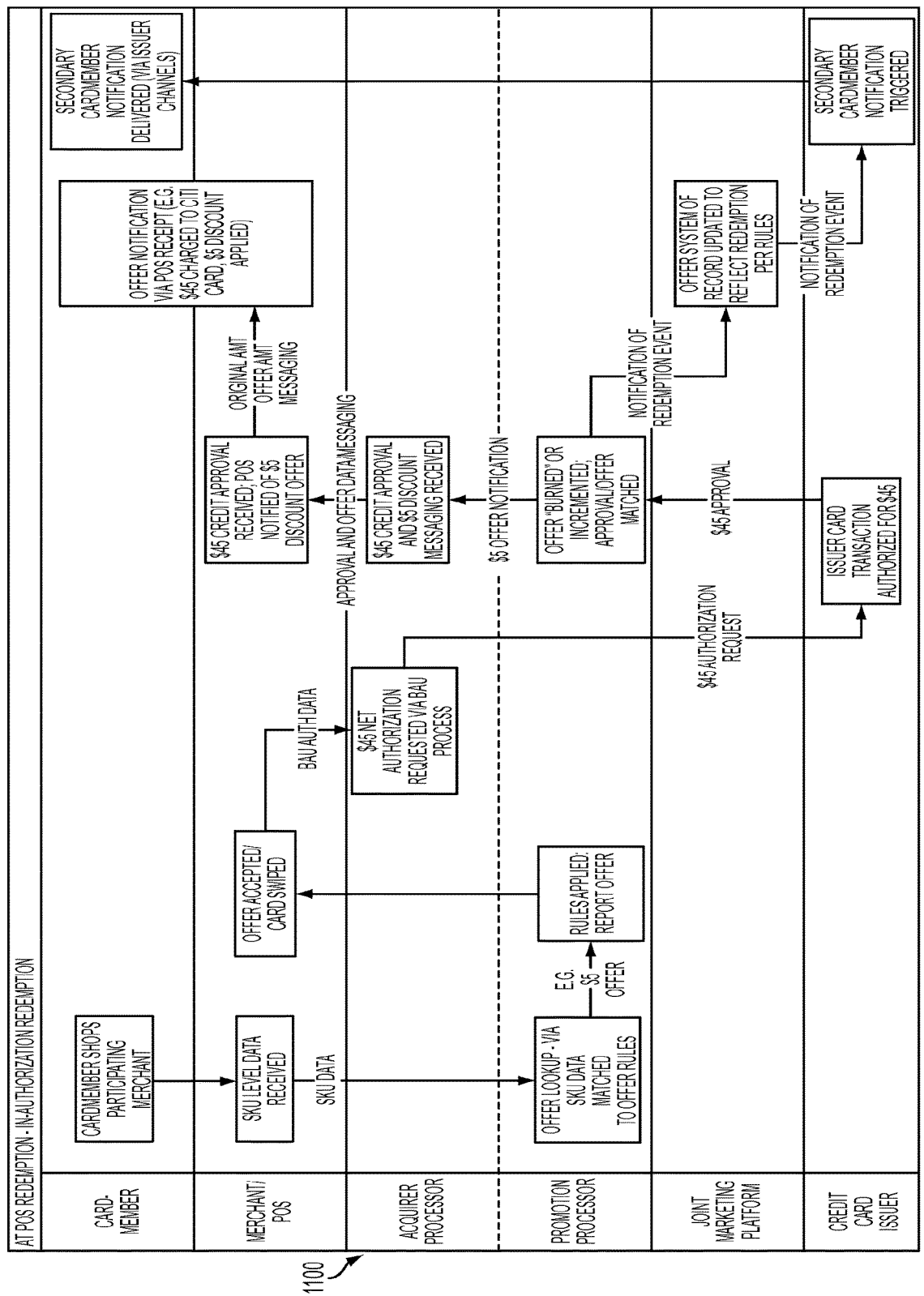
FIG. 11 depicts an example flow diagram of a system in accordance with another non-limiting embodiment.

In FIG. 10, an example flow diagram 1000 is presented. The flow diagram 1000 illustrates respective operations of the cardmember, merchant point of sale system, acquirer processor, promotion processer, and credit card issuer as described above for the system 100 of FIG. 1 and system 400 of FIG. 4. The flow diagram 1000 illustrates an example flow of communications between the computing platforms of the system 400 described above. In FIG. 11, an example flow diagram 1100 is presented. The flow diagram 1100 illustrates respective operations of the cardmember, merchant point of sale system, acquirer processor, promotion processer, and credit card issuer as described above for the system 300 of FIG. 3.

The processes described above can be performed on or between one or more computing devices 700. Referring now to FIG. 4, an example computing device 700 is presented. A computing device 700 can be a server, a computing device that is integrated with other systems or subsystems, a mobile computing device, a cloud-based computing capability, and so forth. The computing device 700 can be any suitable computing device as would be understood in the art, including without limitation, a custom chip, an embedded processing device, a tablet computing device, a point of sale system 112, a back office system 114, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 700 includes a processor 402 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 700 also includes one or more memories 406, for example read only memory (ROM), random access memory (RAM), cache memory associated with the processor 402, or other memories such as dynamic RAM (DRAM), static ram (SRAM), programmable ROM (PROM), electrically erasable PROM (EEPROM), flash memory, a removable memory card or disk, a solid state drive, and so forth. The computing device 700 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 402, or memories 406 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 412 can be configured to transmit to, or receive data from, other computing devices 700 across a network 414. The network and communication interfaces 412 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 412 can include wired data transmission links such as Ethernet and TCP/IP. The communication interfaces 412 can include wireless protocols for interfacing with private or public networks 414. For example, the network and communication interfaces 412 and protocols can include interfaces for communicating with private wireless networks such as a WiFi network, one of the IEEE 802.11x family of networks, or another suitable wireless network. The network and communication interfaces 412 can include interfaces and protocols for communicating with public wireless networks 412, using for example wireless protocols used by cellular network providers, including Code Division Multiple Access (CDMA) and Global System for Mobile Communications (GSM). A computing device 700 can use network and communication interfaces 412 to communicate with hardware modules such as a database or data store, or one or more servers or other networked computing resources. Data can be encrypted or protected from unauthorized access.

In various configurations, the computing device 700 can include a system bus 416 for interconnecting the various components of the computing device 700, or the computing device 700 can be integrated into one or more chips such as programmable logic device or application specific integrated circuit (ASIC). The system bus 416 can include a memory controller, a local bus, or a peripheral bus for supporting input and output devices 404, and communication interfaces 412. Example input and output devices 404 include keyboards, keypads, gesture or graphical input devices, motion input devices, touchscreen interfaces, one or more displays, audio units, voice recognition units, vibratory devices, computer mice, and any other suitable user interface.

The processor 402 and memory 406 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. An electronic transaction modification method, the method comprising:
   receiving, by an acquirer computing system via a user interface, parameters to initiate an electronic transaction;
   receiving, by the acquirer computing system, transaction data from an issuer computing system based on the parameters;
   based on the parameters and the transaction data, generating, by the acquirer computing system, at least one of:
   a first segment definition based on a tokenized account identifier of a merchant; and
   a second segment definition based on a tokenized account identifier of at least one customer;
   receiving, by the acquirer computing system, a transaction modification query from one or more point of sale systems; and
   determining, by the acquirer computing system, whether a transaction modification is applicable to the electronic transaction based on the transaction modification query and at least one of the first segment definition and the second segment definition.

2. The method of claim 1, wherein the transaction modification query further comprises transaction identifying indicia including an identifier, and
   wherein the determination of whether the transaction modification is applicable to the electronic transaction is based on the identifier.

3. The method of claim 2, the method further comprising:
   receiving, by the acquirer computing system, a first authorization request from the one or more point of sale systems;
   generating, by the acquirer computing system, a second authorization request based on the first authorization request; and transmitting, from the acquirer computing system to the one or more point of sale systems, an authorization response in accordance to the second authorization request, the authorization response including an additional message resolving a discrepancy between the first authorization request and the second authorization request.

4. The method of claim 1, wherein the transaction modification is tied to a customer, and
wherein the customer is identifiable to the acquirer computing system based on a plurality of cards affiliated with the customer.

5. The method of claim 1, wherein at least one of the one or more point of sale systems is operated by a merchant, further comprising:
transmitting, by the acquirer computing system a net settlement based on the electronic transaction to the merchant.

6. The method of claim 1, wherein the at least one of the first segment definition and the second segment definition is received through a promotions transaction modification interface.

7. The method of claim 1, wherein the transaction modification query is generated by the point of sale system in response to a pre-swipe event.

8. A system, comprising:
one or more computer readable media storing instructions for executing an electronic transaction modification; and
one or more processors configured to execute the instructions to perform operations comprising:
receiving, by an acquirer computing system via a user interface, parameters to initiate an electronic transaction;
receiving, by the acquirer computing system, transaction data from an issuer computing system based on the parameters;
based on the parameters and the transaction data, generating, by the acquirer computing system, at least one of:
a first segment definition based on a tokenized account identifier of a merchant; and
a second segment definition based on a tokenized account identifier of at least one customer;
receiving, by the acquirer computing system, a transaction modification query from one or more point of sale systems; and
determining, by the acquirer computing system, whether a transaction modification is applicable to the electronic transaction based on the transaction modification query and at least one of the first segment definition and the second segment definition.

9. The system of claim 8, wherein the transaction modification query further comprises transaction identifying indicia including an identifier, and
wherein the determination of whether the transaction modification is applicable to the electronic transaction is based on the identifier.

10. The system of claim 9, wherein the one or more processors are configured to execute the instructions to perform additional operations comprising:
receiving, by the acquirer computing system, a first authorization request from the one or more point of sale systems;
generating, by the acquirer computing system, a second authorization request based on the first authorization request; and
transmitting, from the acquirer computing system to the one or more point of sale systems, an authorization response in accordance to the second authorization request, the authorization response including an additional message resolving a discrepancy between the first authorization request and the second authorization request.

11. The system of claim 8, wherein the transaction modification is tied to a customer, and
wherein the customer is identifiable to the acquirer computing system based on a plurality of cards affiliated with the customer.

12. The system of claim 8, wherein at least one of the one or more point of sale systems is operated by a merchant, and
wherein the operations further comprises:
transmitting, by the acquirer computing system a net settlement based on the electronic transaction to the merchant.

13. The system of claim 8, wherein the at least one of the first segment definition and the second segment definition is received through a promotions transaction modification interface.

14. The system of claim 8, wherein the transaction modification query is generated by the point of sale system in response to a pre-swipe event.

15. A non-transitory computer-readable medium storing instructions for executing an electronic transaction modification, the instructions, when executed by one or more processors, causing the one or more processors to perform operations comprising:
receiving, by an acquirer computing system via a user interface, parameters to initiate an electronic transaction;
receiving, by the acquirer computing system, transaction data from an issuer computing system based on the parameters;
based on the parameters and the transaction data, generating, by the acquirer computing system, at least one of:
a first segment definition based on a tokenized account identifier of a merchant; and
a second segment definition based on a tokenized account identifier of at least one customer;
receiving, by the acquirer computing system, a transaction modification query from one or more point of sale systems; and
determining, by the acquirer computing system, whether a transaction modification is applicable to the electronic transaction based on the transaction modification query and at least one of the first segment definition and the second segment definition.

16. The non-transitory computer-readable medium of claim 15, wherein the transaction modification query further comprises transaction identifying indicia including an identifier,
wherein the determination of whether the transaction modification is applicable to the electronic transaction is based on the identifier, and
wherein the identifier is at least one of a merchant identification number (MID) identifier, a loyalty program identifier, a bank identification number (BIN) identifier, a merchant category code (MCC) identifier, a media access control (MAC) identifier, an internet protocol (IP) identifier, a geographic identifier, a payment type identifier, or a customer name.

17. The non-transitory computer-readable medium of claim 15, wherein the transaction modification is tied to a customer, and
wherein the customer is identifiable to the acquirer computing system based on a plurality of cards affiliated with the customer.

18. The non-transitory computer-readable medium of claim 15, wherein at least one of the one or more point of sale systems is operated by a merchant, and
wherein the operations further comprises:
transmitting, by the acquirer computing system a net settlement based on the electronic transaction to the merchant;
receiving, by the acquirer computing system, a first authorization request from the one or more point of sale systems;
generating, by the acquirer computing system, a second authorization request based on the first authorization request; and
transmitting, from the acquirer computing system to the one or more point of sale systems, an authorization response in accordance to the second authorization request, the authorization response including an additional message resolving a discrepancy between the first authorization request and the second authorization request.

19. The non-transitory computer-readable medium of claim 15, wherein the at least one of the first segment definition and the second segment definition is received through a promotions transaction modification interface.

20. The non-transitory computer-readable medium of claim 15, wherein the transaction modification query is generated by the point of sale system in response to a pre-swipe event.

* * * * *